Nov. 6, 1962  C. E. ANDERSON ET AL  3,061,938
CALIPERING TOOLS

Filed Feb. 18, 1959  8 Sheets-Sheet 7

John C. Kinley
Frank F. Robertson
Clifford E. Anderson
INVENTORS

BY Hayden & Pravel

ATTORNEYS

John C. Kinley
Frank F. Robertson
Clifford E. Anderson
INVENTORS

BY Hayden & Pravel
ATTORNEYS

United States Patent Office 3,061,938
Patented Nov. 6, 1962

3,061,938
CALIPERING TOOLS
Clifford E. Anderson, Frank F. Robertson, and John C. Kinley, Houston, Tex., assignors, by direct and mesne assignments, to John C. Kinley
Filed Feb. 18, 1959, Ser. No. 794,118
29 Claims. (Cl. 33—178)

This invention relates to calipering tools, and particularly to pipe calipering tools for indicating surface variations in a pipe such as used in a well.

In United States patent application Serial No. 653,649, a calipering tool is provided wherein each of a plurality of calipering feelers is provided with a means for indicating the movements of each feeler in response to variations in the surface of the tube, pipe or other surface being calipered.

An object of this invention is to provide a new and improved calipering tool having all of the advantages of the calipering tool disclosed in said application, and in addition thereto having certain additional improvements and advantages to be hereinafter described.

An important object of this invention is to provide a new and improved centralizer structure for use in a calipering tool or any similar tool.

Another object of this invention is to provide a new and improved calipering tool having means therewith for retracting the stylus member or members from engagement with the chart so that, during the transportation of the tool to or from the point of use, damage to the chart and to the stylus member or members is prevented, and no lines are accidentally formed on the chart.

Still another object of this invention is to provide a new and improved calipering tool having a new and improved mounting means for each stylus member to accurately position each stylus member in relation to the other stylus members and with respect to the chart engaged thereby.

A further object of this invention is to provide a new and improved calipering tool having a new and improved seal for preventing the ingress of well fluid into the chart area without interfering with the action of the tool in detecting and indicating surface variations.

Still a further object of this invention is to provide a new and improved calipering device wherein the chart is mounted within a protective sleeve during assembly to prevent damage to the surface of the chart which is contacted by the stylus member or members.

A particular object of this invention is to provide a new and improved calipering tool having a drive means for a chart which is held inactive by at latch mechanism but which is releaseable by either hitting the tool on the bottom of the well or by tripping in a collar in the pipe to be calipered.

Another object of this invention is to provide a new and improved calipering tool having a new and improved feeler and transmitting means therewith for transmitting to a stylus the feeler movement due to variations in the surfaces encountered by the feelers.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

In the drawings, the letter T designates generally the calipering tool of this invention which is adapted to be lowered into a well tubing or other pipe P on a wire line W or any other support extending from the surface of the well. Normally, the tubing or pipe P which is to be calipered with the calipering tool T of this invention is located within a well casing C although the well casing C may itself be calipered in some instances. Briefly, the calipering tool T includes a housing H which extends for substantially the full length of the tool T. As will be explained more in detail, the tool T includes a plurality of feelers F which extend from the body H and engage the inner surface of the tubing or pipe P during the use of the tool T. A centering mechanism A is mounted with the body H for centering the body H within the pipe P during a calipering operation so that the feelers F do not perform the centering function. As will be explained, the tool T is lowered into the pipe P in an inactive position with the feelers F out of engagement with the inside of the tubing or pipe P until a latch mechanism which is generally designated with the letter L is actuated to effect a release of the feelers F.

Figure 2A:
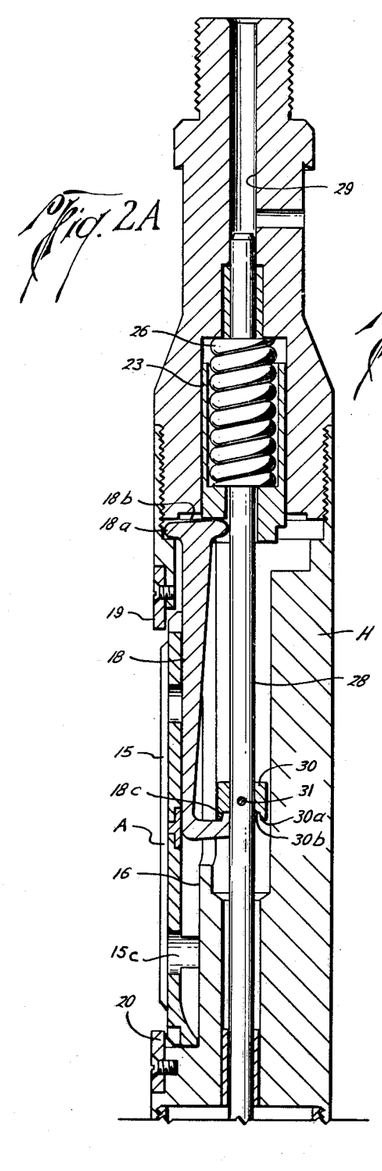
FIGS. 2A, 2B, 2C, 2D and 2E are vertical sectional views, partly in elevation, illustrating in detail the calipering tool of this invention from the upper end thereof to the lower end thereof, respectively.
Figure 8:
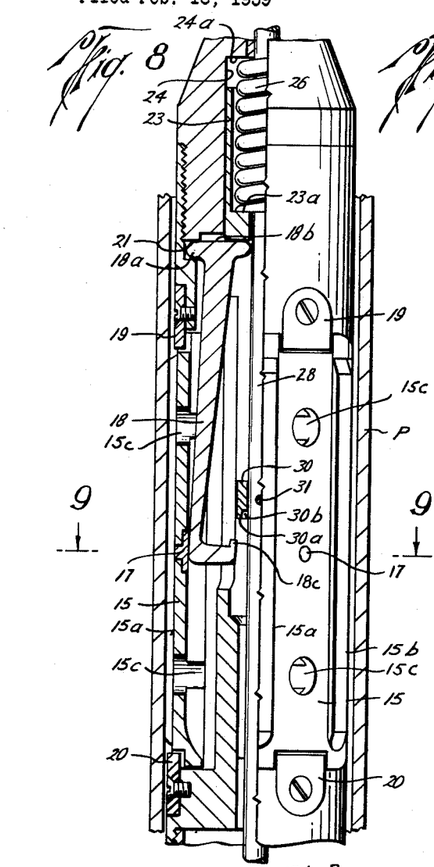
FIG. 8 is a vertical sectional view, partly in elevation, illustrating a portion of the well calipering tool of this invention, and particularly the centering mechanism after the device has been released for centering the tool in a pipe or well tubing.
Figure 9:
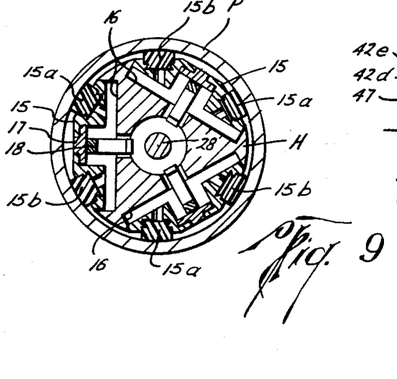
FIG. 9 is a horizontal sectional view taken on line 9—9 of FIG. 8.

Considering the invention in detail, the housing H is formed in a plurality of sections which are threaded or are otherwise suitably connected together to form the complete housing, in the preferred form of the invention. The centering means or mechanism A is preferably positioned near the upper end of the housing or body H and it includes a plurality of pipe engaging members or shoes 15. The number of the pipe engaging members or shoes 15 may be varied, but as illustrated in the drawings, there are three of such shoes 15 and they are arranged so as to engage the inside of the pipe or tubing P at equidistant areas. The details of the centering means or mechanism are shown in FIGS. 2A, 8 and 9. The body H is formed with a longitudinal recess 16 for each of the pipe engaging members or shoes 15, and each of the members or shoes 15 is so mounted in the recesses or slots 16 that they can move laterally inwardly and outwardly with respect to the body H. Each of the pipe engaging members or shoes 15 includes circumferentially spaced runners 15a and 15b which extend longitudinally for substantially the full length of each of the shoes 15. Such runners 15a and 15b are mounted on the body of each of the members 15, preferably as inserts which are removable for replacement purposes. Various materials may be used in constructing the runners 15a and 15b, but to reduce damage to the pipe P in which the tool T is used, the runners 15a and 15b normally are formed of a plastic material which is relatively soft as compared to the metal or other material used in the well tubing or pipe P.

At substantially the mid-point, both laterally and vertically, of each pipe engaging member 15, a contact pad 17 is provided for engagement by a pivoted arm 18, for a purpose to be hereinafter explained. The inward movement of each of the members or shoes 15 with respect to the body H is limited by the engagement of the shoes 15 with the arms 18 or with the inner surfaces of the recesses 16. Each shoe 15 has holes 15c therethrough for fluid relief. The outward movement of the shoes 15 is limited by the engagement of the members 15 with upper stop plates 19 and lower stop plates 20 which are connected to the body H with screws or any other suitable attaching means.

In the preferred form of the invention, a separate arm 18 is provided for each of the shoes 15, with the upper end of each arm 18 having an outwardly extending projection 18a which fits within a recess 21 suitably formed in the housing or body H so as to permit each arm 18 to pivot relative to the housing H. The upper end 18b of each arm 18 is in engagement with the lower end of a sleeve 23 which is slidably mounted in an enlarged diameter opening 24 within the housing H. A coil spring or other suitable resilient member 26 is positioned within the enlarged diameter opening 24 and such spring 26 is confined between a laterally extending shoulder 24a and a lateral shoulder 23a at the lower part of the sleeve 23 so that when the arms 18 are free to move or pivot, the spring 26 acts in a downward direction to urge the sleeve 23 downwardly for swinging the arms 18 laterally outwardly at their point of engagement with the pads 17 of the members 15. When the arms 18 are in a retracted position (FIG. 2A) the coil spring 26 is confined under compression, and it therefore accomplishes the pivotal movement of the arms 18 when the arms 18 are released as illustrated in FIG. 8 of the drawings. Since the arms 18 engage the shoes 15 at substantially the mid-point thereof on the pads 17, each shoe when in contact with the pipe P is free to swing or pivot both longitudinally and laterally about the pad 17 as a pivot point until several points of contact are established between each shoe 15 and the pipe P. In such manner, the load on each shoe is distributed and each shoe has its outer surface, which is formed by its runners 15a and 15b, in contact with and generally parallel with the inner surface of the pipe. Therefore, even though the inner surface of the pipe may not be truly vertical or straight at a particular elevation or section, the shoes 15 can still swing to engage the inner surface of the pipe P at several points, usually at least three points. It should also be noted that if the body or housing H is not centered in the pipe P when the shoes 15 are in engagement with the pipe P, then one or two of the shoes 15 will be receiving all of the spring pressure from the spring 26 which causes a rapid shifting of the housing H in a direction away from the shoes 15 which are receiving the spring pressure. Such shifting moves the housing H until the spring pressure from the spring 26 is uniformly distributed to each arm 18 and therefore to each shoe 15 which accomplishes a centering of the housing H in the pipe P.

The means for holding the arms 18 in the retracted position shown in FIG. 2A and for subsequently releasing same include a long rod 28 which extends through a central opening 29 which is continued through a substantial portion of the full length of the body or housing H. The rod 28 has a retaining cup 30 secured thereon with a pin 31 or any other suitable securing means. The cup 30 is provided with a lip 30a and an inner recess or pocket 30b. Each of the arms 18 has an inwardly extending tip 18c which is adapted to extend into the pocket or recess 30b so that the lip 30a prevents lateral movement of the arms 18 until the rod 28 and the cup 30 have moved longitudinally upwardly with respect to the arms 18. Such upward movement of the rod 28 and the cup 30 is accomplished with a spring 33 which will be hereinafter described.

Figure 1:
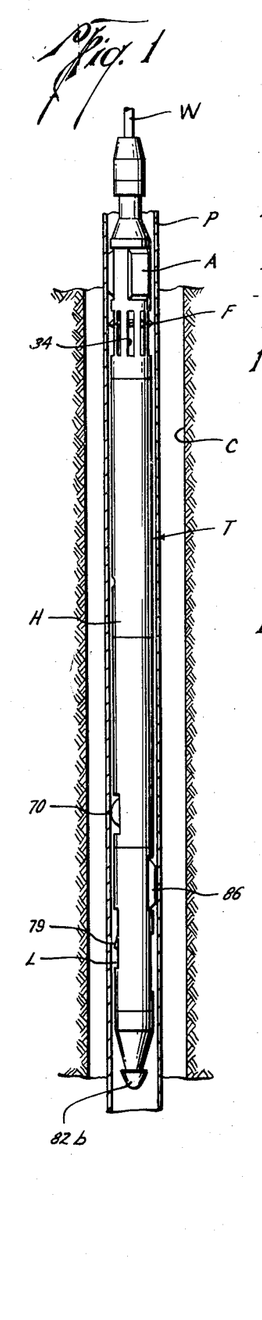
FIG. 1 is an elevation of the well calipering tool of this invention shown in position within a well tubing or pipe to indicate the customary use of the tool of this invention.
Figure 2B:
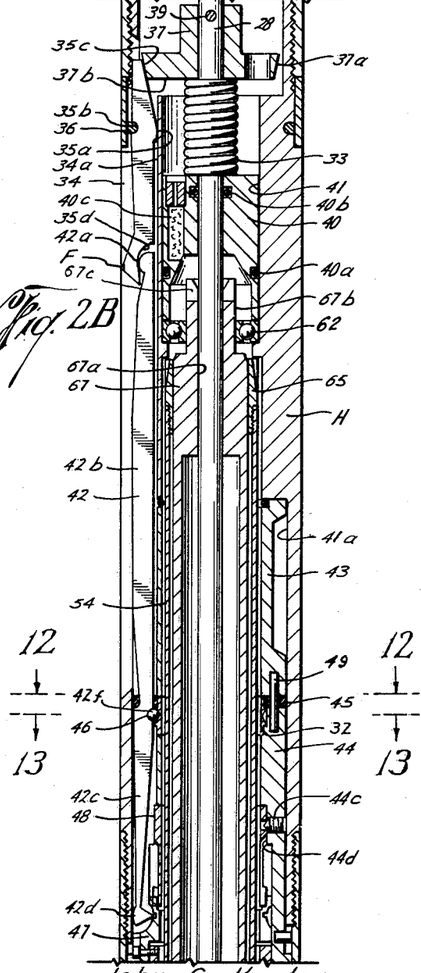

The calipering tool T has a plurality of the feelers F which extend through suitable openings 34 in the body H (FIGS. 1 and 2B). The sides of the openings or slots 34 in the body H serve to prevent turning and therefore they guide the lateral movement of the feelers F as they move inwardly and outwardly with respect to the housing H. The feelers F are normally made of steel, and they are arranged circumferentially as best seen in FIG. 1 so that each of such feelers F would normally engage the inside of the pipe P. Although the number of the feelers F may vary, in actual practice, fifteen or more feelers F would be used because it is desirable to have as many feelers contacting the inside surface of the pipe P at each elevation traversed by the calipering tool T as possible commensurate with the legibility of the record obtained on the chart inside of the tool.

Each of the slots 34 in the body H terminates in an inner wall 34a, and each feeler F has an inner surface 35a which is in contact with the surface 34a. Each feeler F also has an outer notch 35b which is positioned on a pivot ring 36 which is preferably formed in two semi-circular halves. Therefore, each of the feelers F is confined against lateral movement except for the pivoting action about the pivot ring 36. In order to retain the feelers F in a retracted position during the lowering of the calipering tool T to a position in the pipe or tubing P for beginning a calipering operation, each of the feelers F is provided with an internal surface 35c which is normally tapered outwardly and upwardly (FIG. 2B) for engagement with a retaining collar 37 which preferably has a correspondingly tapered surface 37a for engagement with the surfaces 35c of the feelers F. The retaining collar 37 is secured to the rod 28 by a pin 39 or any other suitable securing means so that the rod 28 and the collar 37 move longitudinally together. The spring 33 which was previously mentioned for use in conjunction with the release of the centering means A, is also used in conjunction with the release of the collar 37 from the feelers F. Such spring 33 is positioned with its upper end in engagement with the lower lateral surface 37b of the collar 37 and with its lower end in engagement with a bushing 40 which is positioned within the bore 41 of the body H. The spring 33 is confined under compression (FIG. 2B) when the feelers F are in the retracted position so that upon a release of the rod 28 for longitudinal movement relative to the body H, as will be explained hereinafter, the spring 33 acts to move the collar 37 longitudinally to a position above the upper ends of the feelers F (FIG. 7) so that the feelers F may then move laterally or radially outwardly into engagement with the inside surface of the pipe or tubing P. A transmitting member or arm 42 is provided in the housing H for each of the feelers F. Each feeler F has an inner pocket or curved surface 35d which is engaged by a rounded or curved head 42a at the upper end of each of the transmitting arms 42. The transmitting arms 42 are formed of a resilient metal such as spring steel and they are so mounted that they exert an outward resilient force on the feelers F to urge them into contact with the inside surface of the tubing or pipe P being calipered after the feelers F have been released to the position shown in FIG. 7. The transmitting arms 42 are prevented from turning or twisting and are therefore guided in their lateral or radial movement by the walls of the slots 34 for a portion of their length near the upper end thereof, and the remainder of each arm 42 is guided by the walls of longitudinal slots 43a of a cylindrical stylus tube extension 43 and corresponding slots 44a of a cylindrical stylus tube 44. The stylus tube 44 and the stylus tube extension 43 are positioned within an enlarged bore portion 41a of the body H and they are separated by a rubber ring 45 through which each of the transmitting arms 42 extends, as will be more fully explained. Each of the transmitting arms 42 has a notch 42f by which the arm is mounted on a ball 46 or other suitable support means to provide a support for preventing each of the transmitting arms 42 from moving longitudinally and to serve as a fulcrum when a bending moment is imparted to each of the transmitting arms 42, as will be explained. The upper portion 42b of each arm 42 above the ball or other support 46 is adapted to flex or bend as the feelers F in conjunction therewith move inwardly and outwardly in response to the surfaces encountered in the pipe P. Such flexing or bending of the upper portion 42b of each transmitting arm 42 causes the lower portion 42c of each transmitting arm 42 to be placed under a strain which accomplishes a deforming of the strain portion 42c for imparting longitudinal movement to each of such portions 42c. Each arm 42 also has an outer surface 42d at its lower end which is in engagement with the wall of the enlarged bore 41a so that outward lateral movement of each lower portion 42d is prevented. Likewise, inward lateral movement of the lower end of each of the arms 42 is prevented by maintaining each arm portion 42b under compression or stress at all times regardless of the position of the feeler F therewith so that the outer surface 42d is always urged into contact with the wall of bore 41a of the housing H and each arm 42 at its notch 42f is maintained in firm engagement with one of the balls 46. The pressure thus acting on each arm 42 also maintains the balls in the circumferential V-shaped groove 32a in a ball support sleeve 32.

The ring 45, previously referred to, is formed of rubber or other resilient material which is capable of forming a seal with the inside wall of the bore 41a, with the ball support sleeve 32 and also with each of the transmitting arms 42 (FIGS. 2B and 12-14). The ring 45 is confined between the stylus tube 44 and the stylus tube extension 43 to likewise provide a seal between such parts. The ring 45 is located as close to the balls 46 as possible so that during the flexing of the upper portions 42b of the arms 42, substantially no movement occurs in the arms 42 where the seal ring 45 engages therewith. Therefore, the seal provided by the ring 45 is maintained at all times even though the transmitting arms 42 are flexing or are bending during use. It should also be noted that the stylus tube 44 and the stylus tube extension 43 are aligned with an aligning pin or pins 49 which also extend through the seal ring 45. Such alignment pin or pins 49 serve to align the stylus tube 44 and the stylus tube extension 43 to properly position the vertical slots therein for receiving the transmitting arms 42. The ball support sleeve 32 is formed with a circumferential V-shaped groove 32a (FIG. 14) for receiving the balls 46 to prevent longitudinal movement thereof relative to the sleeve 32. The sleeve 32 is press fitted into the bore of the stylus tube 44 so that the lower annular edge 32b thereof engages an annular lateral shoulder 44e in the tube 44 which serves to align the groove 32a with openings 44f which are drilled or are otherwise formed in the walls of slots 44a to receive the balls 46. The upper end 32c projects above the upper end of the tube 44 for engagement with the lower end of the stylus tube extension 43. The end 32c is of substantially the same external diameter as the internal diameter of the seal ring 45 so that such end 32c fits into the bore 45a of the ring 45 and extends upwardly about the same distance as the thickness of the ring 45. In that manner the ring 45 provides a seal between the ends of the tube 44 and the extension 43, and the end 32c prevents an extrusion of the ring inwardly while sealing therewith. It can be seen in FIG. 12 that the seal ring 45 is provided with openings 45b for the arms 42 and with spacer openings 45c, at least one of which is used for the aligning pin 49 shown therein.

A multi-prong spring 48 having an upper cylindrical portion 48a and a spring prong 48b depending therefrom for each arm 42 is positioned within the housing H and is confined within a bore 44d of the stylus tube 44. A set screw 44c is used for holding the cylindrical spring 48 in position within the stylus tube 44. The upper end 47b of each adjusting block 47 is substantially V-shaped and is in engagement with the external surface of one prong 48b of the spring 48 near its lower end in the V-shaped groove 48c provided therein, and is adapted to move longitudinally relative thereto and in contact therewith, while being restrained from any lateral movement relative to the prong 48b. In that manner, the lower end of the spring 48 serves to guide the block 47 for each of the transmitting arms 42 as it moves longitudinally in response to the movement of the arm 42 connected therewith. It should be noted that the pointed inner end 42e of each transmitting arm 42 extends into a small notch or recess 47a in each of the blocks 47 to effect the transmission of the movement from the arms 42 to each adjusting block 47 so that no lag or slack in the transmission of the movement of each arm 42 to each block 47 occurs.

Figure 10:
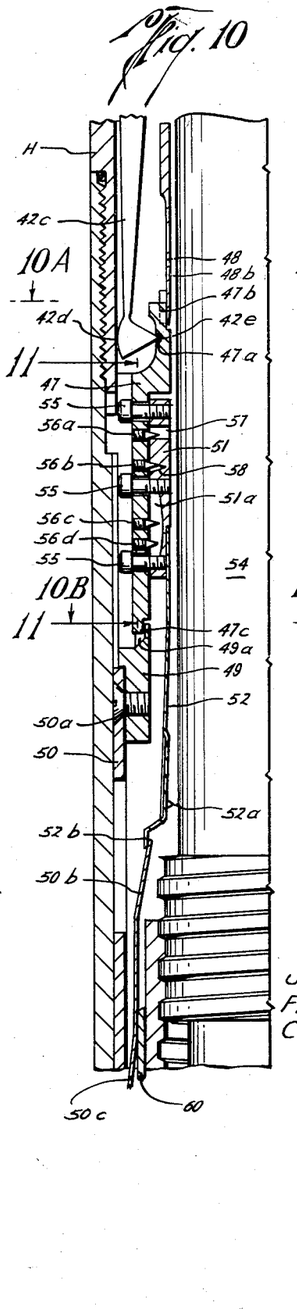
FIG. 10 is a view, partly in elevation and partly in section, illustrating a portion of the calipering tool of this invention, and particularly the adjusting means for the stylus mounting assembly, and also the stylus retractor structure in the calipering tool of this invention.
Figure 10A:
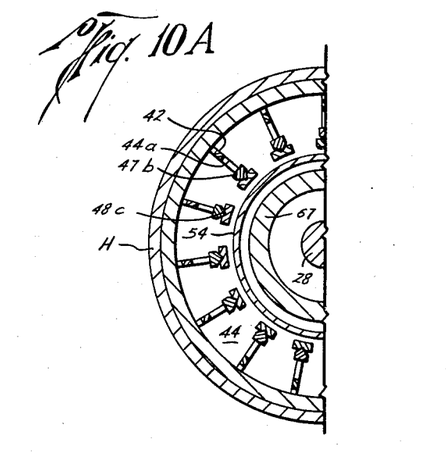
FIG. 10A is a cross-sectional view taken on line 10A—10A of FIG. 10.
Figure 10B:
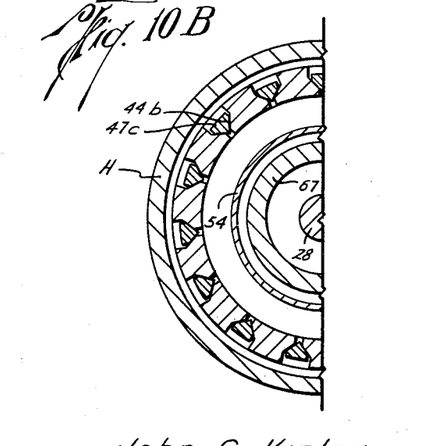
FIG. 10B is a cross-sectional view taken on line 10B—10B of FIG. 10.
Figure 10C:
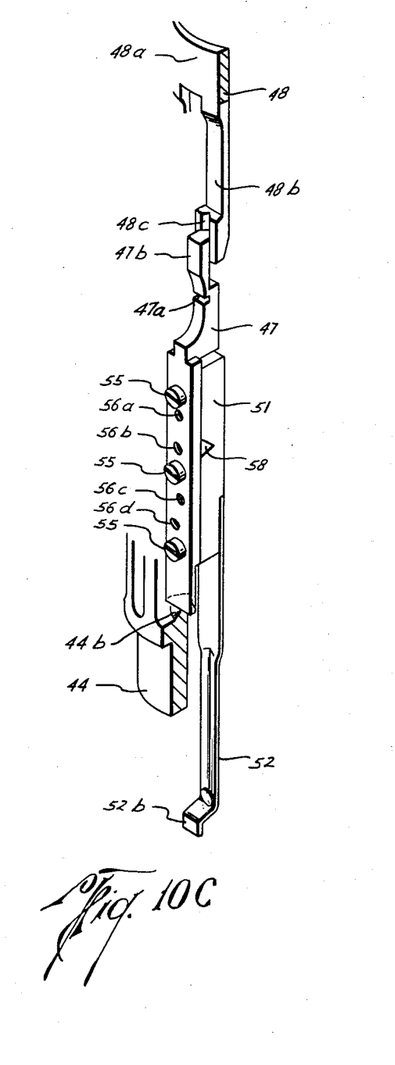
FIG. 10C is an isometric view to illustrate the details of a stylus mounting means for one of the feelers.

The details of the mounting of the adjusting block and the connection with the styluses is shown in particular in FIGS. 2B, 2C, 10, 10A, 10B, 10C, and 11. In FIGS. 10, 10A, and 10C, it can be seen that the upper V-shaped end 47b of each adjusting block 47 is in sliding engagement with the V-shaped groove 48c for the guiding movement previously described during the longitudinal relative movement between the block 47 and the spring 48. The lower end 47c of each adjusting block 47 is mounted in a V-shaped guide slot 44b for sliding movement relative thereto (FIGS. 10B and 10C) while preventing lateral movement of the block 47 relative to the tube 44. It will be appreciated that other types of guide structure could be used for the lower and upper ends of the adjusting blocks 47, but the structure illustrated, particularly in FIGS. 10, 10A, 10B and 10C of the drawings is the preferred form. It should be noted that each spring prong 48b acts to resiliently maintain contact with the upper end 47b of each block 47, and to thereby maintain contact between each block 47 and each arm 42, and between each lower end 47c and the surfaces of each slot 44b. A sleeve 50 having a plurality of retractor fingers 50b connected thereto near the lower end 50d thereof is attached to the tube 44 with screws 50a or other suitable means. Each finger 50b has a curved portion 50c, for a purpose to be hereinafter described.

A stylus block 51 is adjustably attached to the adjusting block 47 for each of the transmitting arms 42. Each of the stylus blocks 51 has a stylus finger 52 extending downwardly therefrom, with a stylus point 52a formed on the inner surface thereof near the lower end. Also, each of the stylus fingers has a downwardly and outwardly extending projection 52b which serves in the retraction of the stylus points 52a, as will be explained. The stylus points 52a are adapted to engage or contact the external surface of a cylindrical chart 54 when operating the mounting of which will be explained in detail hereinafter, so that upon relative movement between the chart and the styluses 52a, lines or other indications are recorded on the surface of the chart 54 to indicate the variations in the surface of the pipe or tubing which are sensed by the feelers F.

Figure 11:
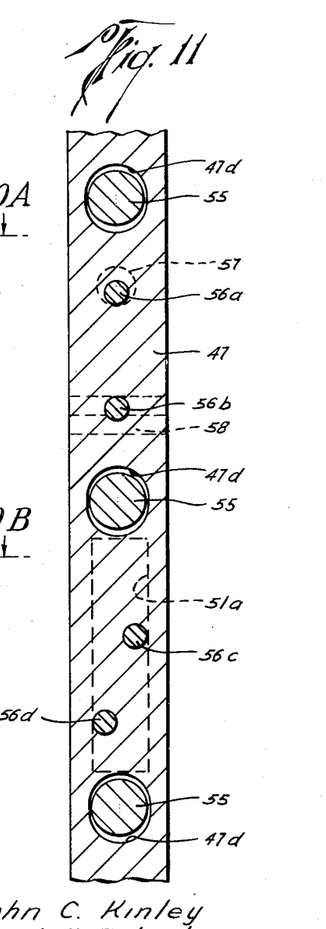
FIG. 11 is an elevation, partly in section, to illustrate in detail the adjusting means for the stylus members in the calipering tool of this invention.
Figure 12:
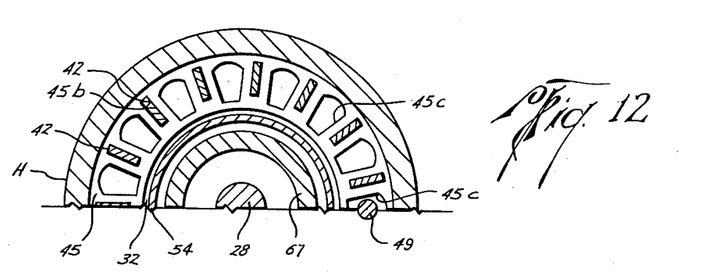
FIG. 12 is a cross-sectional view taken on line 12—12 of FIG. 2B.
Figure 13:
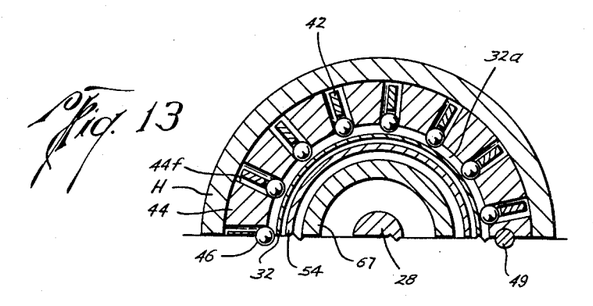
FIG. 13 is a cross-sectional view taken on line 13—13 of FIG. 2B.
Figure 14:
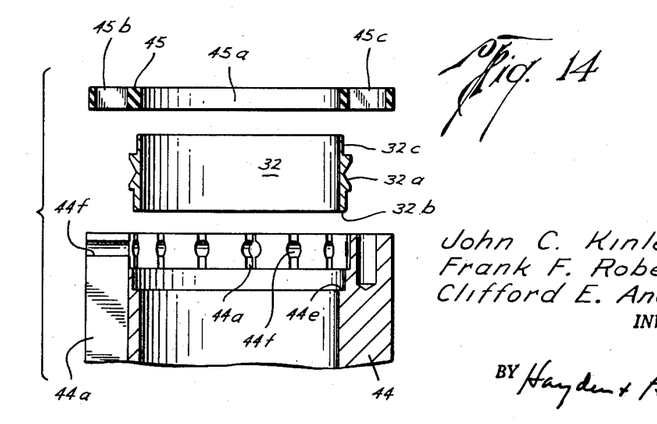
FIG. 14 is an exploded view of a portion of the tool to illustrate the means for locating the transmitting arms longitudinally in the housing or body of the tool.

The adjustment of the styluses 52a with respect to the chart 54 is made very sensitive by the adjusting structure shown in particular in FIGS. 10 and 11 of the drawings so that an accurate positioning of each of the styluses 52a with respect to each other and with respect to the chart may be accomplished. Since relatively small changes are recorded with the calipering tool of this invention, it is important for the adjustment of the position of these styluses 52a to be accurate.

Such adjustment is accomplished by initially loosening holding screws 55 which normally hold the stylus block 51 and the adjusting block 47 securely together. However, when the screws 55 are loosened, then a relative movement is possible between the adjusting block 47 and the stylus block 51. With the screws 55 loosened, longitudinal or vertical adjustment of the stylus block 51 with respect to the adjusting block 47 is accomplished with longitudinal adjusting screws 56a and 56b. Such screws 56a and 56b have conical or tapered inner surfaces which extend into an opening 57 and another opening 58, respectively. The opening 57 is preferably a hole of uniform diameter whereas the opening 58 is preferably a tapered groove or recess of a slightly larger size than the conical or tapered end of the adjusting screw 56b.

The adjusting screw 56a engages the wall or edge of the hole or opening 57 so that as it moved inwardly with respect to such opening 57, it tends to move the stylus block 51 downwardly. The adjusting screw 56b likewise engages with the inner surface of the opening 58 so that as it is moved inwardly with respect to the opening 58, the stylus block 51 is moved upwardly. Therefore, in order to move the stylus block 51 in either the upward or the downward direction, it is necessary to unthread or move one of the screws 56a or 56b outwardly and the other of such screws inwardly. For example, if it is desired to move the stylus block 51 downwardly, the screw 56a would be moved inwardly and the screw 56b would be moved outwardly so that an accurate shifting or movement longitudinally of the stylus block 51 is accomplished relative to the adjusting block 47 and when the desired position is reached, the screws 56a and 56b retain the exact position set between such blocks 51 and 47.

The lateral or circumferential adjustment of the stylus block 51 with respect to the adjusting block 47 is accomplished with adjusting screws 56c and 56d, both of which extend into a longitudinal slot 51a in the stylus block 51.

The adjusting screw 56c has an inner tapered or conical point which is adapted to engage the right hand wall of the slot 51a (FIG. 11); and the adjusting screw 56d has a similar tapered or conical point which is adapted to engage the left hand wall of the slot 51a (FIG. 11). Therefore, upon an inward movement of the screw 56c relative to the block 51, the block 51 is moved to the right as viewed in FIG. 11. Upon an inward movement of the screw 56d relative to the block 51, the block 51 is moved to the left as viewed in FIG. 11. Therefore, to accomplish the movement of the block 51 in a desired direction and to maintain such block 51 in the desired position after it has been moved laterally or circumferentially with the screws 56c and 56d, either one of the screws 56c or 56d is moved inwardly while the other screw is moved outwardly. For example, if it is desired to move the block 51 to the right, the screw 56c would be moved inwardly while the screw 56d is moved outwardly. In such movement the screw which is being moved outwardly is moved first. After the block 51 is accurately positioned with the adjusting screws 56a, 56b, 56c and 56d, then the holding screws 55 are tightened to firmly clamp the adjusting block 47 and the stylus block 51 together. It is to be noted that the openings 47d for each of the holding screws 55 is enlarged as compared to the diameter of the holding screws 55 so that the adjustment of the stylus block 51 relative to the adjusting block 47 is accomplished without interference from the screws 55. It will also be noted that the groove 58 for 56b permits the lateral motion of 56c and 56d to pivot about 56a without binding 56b because 56b can move laterally in the groove 58. It will be understood that each stylus block 51 for each of the arms 42 is adjusted separately and individually with the structure described in connection with the single arm 42 illustrated in FIG. 10 so that an accurate positioning of each stylus or stylus point 52a is thereby accomplished. After the adjustment is accomplished, then the stylus block 51, the stylus finger 52, the stylus or stylus point 52a all move together with the adjusting block 47 in response to the movement of the strain portion 42c of the arm 42 connected therewith.

Figures 2C, 2D:
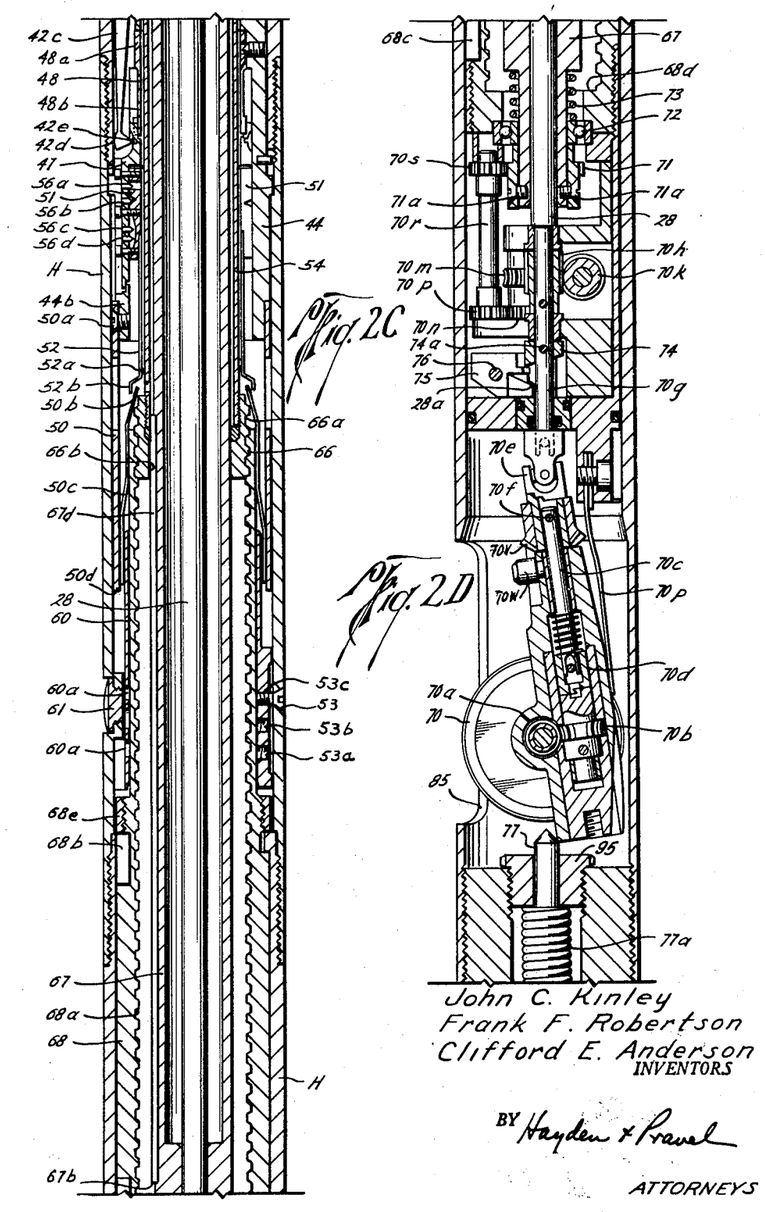

In order to retract the stylus fingers 52 so as to move the styluses 32a out of contact with the chart 54, the sleeve 50 is provided with a retractor finger 50b for each stylus finger 52. Each retractor finger 50b fits inside of the projection 52b of each stylus finger 52 to effect a retraction of the fingers 52 when the retractor fingers 50b are moved radially or laterally outwardly. The stylus fingers 52 are made of a resilient material such as spring steel or beryllium copper so that the inherent resiliency thereof will return them to the position shown in FIG. 2C when it is desired to position the styluses 52a in contact with the chart 54. The radial or lateral outward movement of the retractor fingers 50b is accomplished by moving a retractor sleeve 60 longitudinally upwardly (FIG. 2C) relative to the sleeve 50 so as to force the fingers 50b outwardly to thereby force the stylus fingers 52 outwardly. The upward longitudinal movement of the retractor sleeve 60 is accomplished by removing a plug 61 and locking screw 53 from the housing H so that a screw driver or other similar tool can be inserted into the openings 60a to pry or otherwise urge the retractor sleeve 60 upwardly a sufficient distance to engage the bent or inwardly curved portion 50c of each of the retractor fingers 50b. Upon engagement therewith, the retractor fingers 50b are moved laterally outwardly. The plug 61 and screw 53 are then replaced to hold the sleeve 60 in place. When it is desired to release the retractor fingers 50b and to thereby return the styluses 52a into contact with the chart 54, the plug 61 and the screw 53 are again removed and the retractor sleeve 60 is moved downwardly with respect to the housing H by again inserting a screw driver or other similar tool into the openings 60a to pry or otherwise move the sleeve 60. The plug 61 and the screw 53 are replaced to lock the sleeve 60 in place. The styluses 52a would normally be retracted as shown in FIG. 10 when the tool was being transported and was not in a well, and in such case, the screw 53 would be in the screw hole 53a. Prior to lowering the tool into the well, the retractor sleeve 60 would be lowered to the position shown in FIG. 2C wherein the screw 53 is in the screw hole 53c so that the styluses 52a are in position for marking on the chart 54. However, there is an intermediate position wherein the screw 53 is in the screw hole 53b which is provided for engaging only one of the styluses 52a with the chart 54 while the other styluses 52a are withdrawn from contact with the chart 54. Such result is accomplished because one of the retractor fingers 50b has the bend 50c at a higher elevation than the bends 50c in the rest of the fingers 50b. The retractor finger 50b on the left in FIG. 2C is shown as the finger having the bend 50c higher than the rest of the fingers 50b, and the finger 50b on the right in FIG. 2C shows the location of the bend 50c for all of the other fingers 50b. Therefore, it can be seen that the retractor sleeve 60 in the intermediate position extends upwardly into contact with the bends 50c of all of the fingers 50b except the single finger 50b shown on the left in FIG. 2C so as to move all of such fingers 50b except the single one on the left in FIG. 2C outwardly to retract all of the styluses 52a except the stylus 52a with the single finger 50b which is not moved. When only the single stylus is in engagement with the chart 54, the chart 54 is rotated with a hand tool M (FIG. 4) as will be explained, to trace a single line on the chart 54 which serves as a reference line when a record is subsequently made with all styluses 52a in contact with the chart 54.

Considering now the construction of the chart 54 and the mounting means therewith for effecting a helical or spiral rotation of the chart 54 relative to the styluses 52a, reference is first made to FIGS. 2B, 2C and 2D, wherein it can be seen that the chart 54 is connected at its upper end with a guide sleeve 65 and at its lower end with an annular nut 66 having external threads 66a formed thereon. The chart 54 is positioned around a central drive tube 67 which is provided with a central bore 67a therethrough, through which the rod 28 extends. The drive tube 67 has an upper reduced diameter extension 67b which is mounted in suitable bearings 62 which are confined below the sleeve 40 within the housing H to provide an anti-friction means for the support of the upper end of the drive tube 67 during the rotation thereof relative to the housing H. It should be noted that the bearing 62 and the chart 54 are sealed against the ingress of well fluid by suitable seal means such as the seal rings 40a and 40b. Also, a felt seal 40c is provided to permit equalization of pressure above and below the sleeve 40 without the flow of the well fluid therethrough. Such seal means 40c may be made of felt or any other similar material which will accomplish the purpose.

The drive tube 67 is connected to the annular nut 66 with a key 67d which fits within a keyway 66b in the nut 66 so that rotation of the drive tube 67 is imparted directly to the annular nut 66, but the nut 66 is permitted to move longitudinally relative to the drive tube 67. The nut 66 is in threaded engagement with an internally threaded sleeve 68 which has internal threads 68a in threaded engagement with the threads 66a. Therefore, as the nut 66 is rotated by the rotation of the drive tube 67, the nut 66 is caused to travel spirally in accordance with the pitch and direction of the threads 66a and 68a. The threaded sleeve 68 may be secured in any manner to the housing H, but as shown, a key 68b and a nut 68e are employed to establish such connection so that the threaded sleeve 68 remains fixed in the housing H and does not rotate when the nut 66 is rotated. The chart 54 is shown in FIGS. 2B and 2C as it would appear at the beginning of the recording. During the storage and/or transportation of the calipering tool T of this invention, the chart 54 may be telescoped or partially telescoped within the threaded sleeve 68. During use, the chart 54 would be rotated to move in a downward direction relative to the threaded sleeve 68. Since the chart 54 would be thus moved downwardly in a spiral direction relative to the styluses 52a, the styluses would cut or trace or mark on the exterior surface of the chart 54 a plurality of parallel helical lines of the same pitch and direction, assuming the feelers F are engaging in a smooth pipe. However, for each feeler F which encounters an irregularity in the inside surface of the pipe being calipered, there will be a longitudinal movement of the stylus 52a connected therewith so that there will appear a deflection in the smooth spiral line being traced, cut or marked by the particular stylus 52a. The chart itself can be made of various materials, such as metals or plastics which may be scratched, embossed or otherwise changed so that the record made thereon may be subsequently viewed or detected.

In order to prevent damage to the chart 54 and other parts of the tool, the key 67d terminates at 67b (FIGS. 2C and 2D) so that the nut 66 is adapted to run off the key 67d when the nut 66 reaches the lower end of the sleeve 68. Therefore, after the nut 66 passes below the key 67d, even though the drive tube 67 continues to rotate, no further rotation is imparted to the nut 66 on the chart 54.

Figures 4, 5, 6:
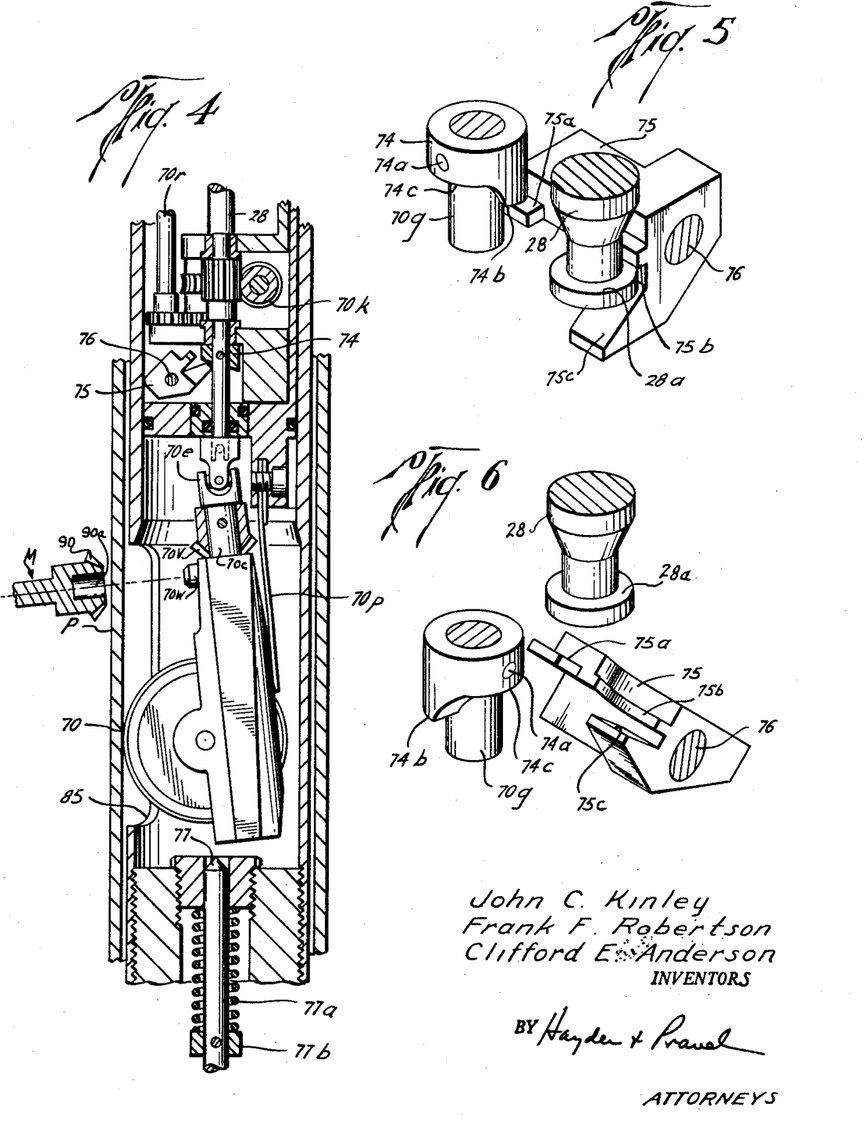
FIG. 4 is a vertical sectional view, partly in elevation, illustrating an enlarged portion of the calipering tool of this invention to show the tool in a released position for rotating the chart in the tool.
FIG. 5 is an isometric view of a pivoted lug arrangement which is releasable by a driving of a wheel inside of the tubing, as will be explained.
FIG. 6 is a view similar to FIG. 5, except that it illustrates the lug and the cam therewith after the lug has been moved to a released position.

The drive tube 67 may be rotated with various types of drive mechanisms, but as illustrated in the drawings, and particularly in FIGS. 2D and 4, the drive tube 67 is driven by a drive wheel 70 which, when released, engages with the inside of the well tubing or pipe P (FIG. 4). The drive wheel 70 rotates or drives gears 70a and 70b to cause a stub shaft 70c to be driven through a one-way clutch 70d which may be of any suitable construction. The stub shaft 70c is connected to a universal joint 70e by means of a pin 70f so that a second stub shaft 70g connected to the universal joint 70e is also driven or rotated. The rotation of the stub shaft 70g is transmitted through gears 70h, 70k and 70m to gears 70n and 70p which are connected to a short shaft 70r having another gear 70s thereon. The gear 70s meshes with a gear 71 which is mounted on the lower end of the drive tube 67 with suitable screws 71a or other suitable attaching means. The gear 71 is positioned below an anti-friction bearing such as the ball bearing 72 which is provided for supporting the drive tube 67 for substantially frictionless rotation. A spring 73 is provided for urging the drive tube 67 upwardly at all times. Also, such spring 73 makes it possible to move the drive tube 67 downwardly to disengage the gear 71 from the gear 70s. Such downward movement is accomplished by pushing downwardly on the upper end of the tube 67 when the housing H is separated at a joint in proximity thereto and then, by inserting a suitable hand tool (not shown) in the slot 67c, the drive tube 67 can be rotated independently of the gears from the drive wheel 70. Such procedure is normally followed in order to move the chart 54 from the telescoped position within the sleeve 68 to the extended position (FIGS. 2B and 2C) for beginning the use thereof because it provides for rapid movement of the chart as compared to the relatively slow movement thereof if rotated by the drive wheel 70.

Figure 7:
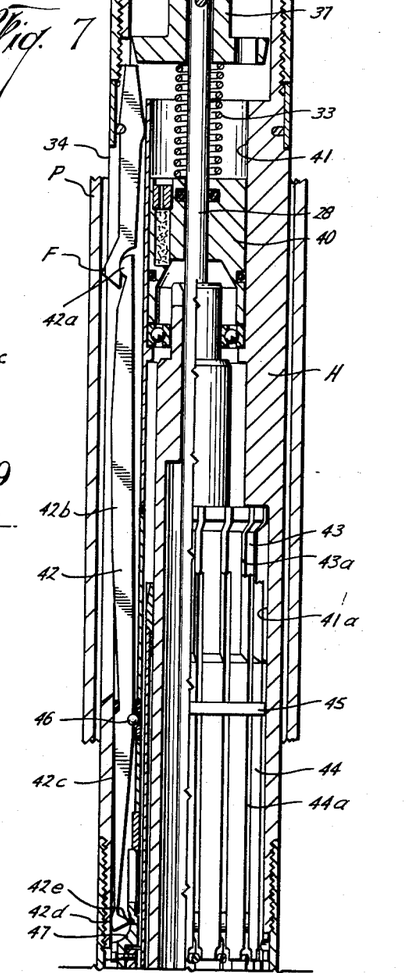
FIG. 7 is a vertical sectional view, partly in elevation, illustrating a portion of the well calipering tool of this invention, and showing in particular the tool after the feelers have been released for engagement with the inside of the well pipe or tubing which is being calipered.

In addition to the driving of the chart 54, the drive wheel 70 is used for effecting a release of the rod 28 from the position shown in FIG. 2D and FIG. 5 to the position shown in FIGS. 4 and 6, which release accomplishes the unlatching of the arms 18 (FIG. 8) and the releasing of the feelers F (FIG. 7). As viewed in FIG. 2D, the rod 28 extends downwardly behind the stub shaft 70g and therefore is only partly visible in FIG. 2D. For purposes of illustration, the relationship of the shaft 70g and the rod 28 has been shown from a different angle in FIG. 5 of the drawings as compared to FIG. 2D. In FIG. 5, it can be seen that the rod 28 has a groove 28a for a purpose to be hereinafter described. The stud shaft 70g has a cam 74 secured thereto with a pin 74a or any other suitable securing means. The cam 74 has a lower lateral surface 74b which extends circumferentially for a portion of the cam cylinder. Such cam surface 74b extends downwardly below the rest of the cam surface 74c which joins therewith.

At latching lug 75 is pivotally mounted in the housing H on a pivot rod 76 for pivotal movement from the position shown in FIG. 2D to the position shown in FIG. 4. The latching lug 75 has a laterally extending projection 75a which is adapted to engage the cam surface 74b so as to prevent a pivotal movement of the latching lug 75 in a counterclockwise direction from the position shown in FIG. 2D, thereby preventing a movement of the rod 28 by the engagement of a projection 75b in the groove 28a of the rod 28. The rod 28 is of course being urged upwardly constantly by the spring action of the spring 33 and therefore there is constant upward force acting from the rod 28 to the lug 75 tending to rotate same about the pivot pin 76 in a counterclockwise direction, but since the projection 75a is in engagement with the cam surface 74b, such pivotal movement of the lug 75 is prevented. However, upon a rotation of the stub shaft 70g so as to position the cam surface 74c above the projection 75a, then the lug 75 can pivot about the pivot rod or pin 76 and will be caused to pivot about such pin or rod 76 by the spring action from the spring 33. When such release of the lug 75 occurs, the lug 75 moves to the position shown in FIGS. 4 and 6 and the rod 28 of course moves upwardly in response to the spring pressure from the spring 33. Such movement of the rod 28 is also imparted to the retaining member 37 which moves with the rod 28 so as to move the retaining member 37 from the position shown in FIG. 2B to the position shown in FIG. 7, whereby the feelers F are then free to move outwardly into contact with the inside surface of the pipe P by the urging of the resilient transmitting arms 42. Also, the retaining cup 30 is moved upwardly with the rod 28 from the position shown in FIG. 2A to the position shown in FIG. 8 so that the spring 26 then urges the arms 18 outwardly to move the centering members or shoes 15 into engagement with the inside surface of the pipe P.

When it is desired to re-set or re-cock the tool to place the feelers F and the shoes 15 in a latched position again, the rod 28 is forced downwardly by hand to engage the lip 75c which forces the lug 75 to return to the position shown in FIG. 5 with the projection 75b in the groove 28a. Then, the shaft 70g is rotated to again position the cam surface in engagement with the lug 75a. Such rotation of the shaft 70g can be done with the hand tool M or any suitable device which has a bevel gear 90 for engagement with a bevel gear 70v connected to the shaft 70c. An alignment pin 70w is also provided for positioning in a central hole 90a on the tool M to maintain the gear 90 meshing with the gear 70v as they are turned. The turning of the shaft 70c at the point of the gear 70v eliminates the gear reduction which occurs when driving the shaft 70c from the drive wheel 70 through the gears 70a and 70b. The one-way clutch 70d (FIG. 2D) enables the shaft 70c to be rotated without rotating the wheel 70. The foregoing procedure is also used when rotating the chart 54 to trace the single stylus 52a thereon when the retractor sleeve 60 is in the intermediate position, as previously explained.

Figures 2E, 3:
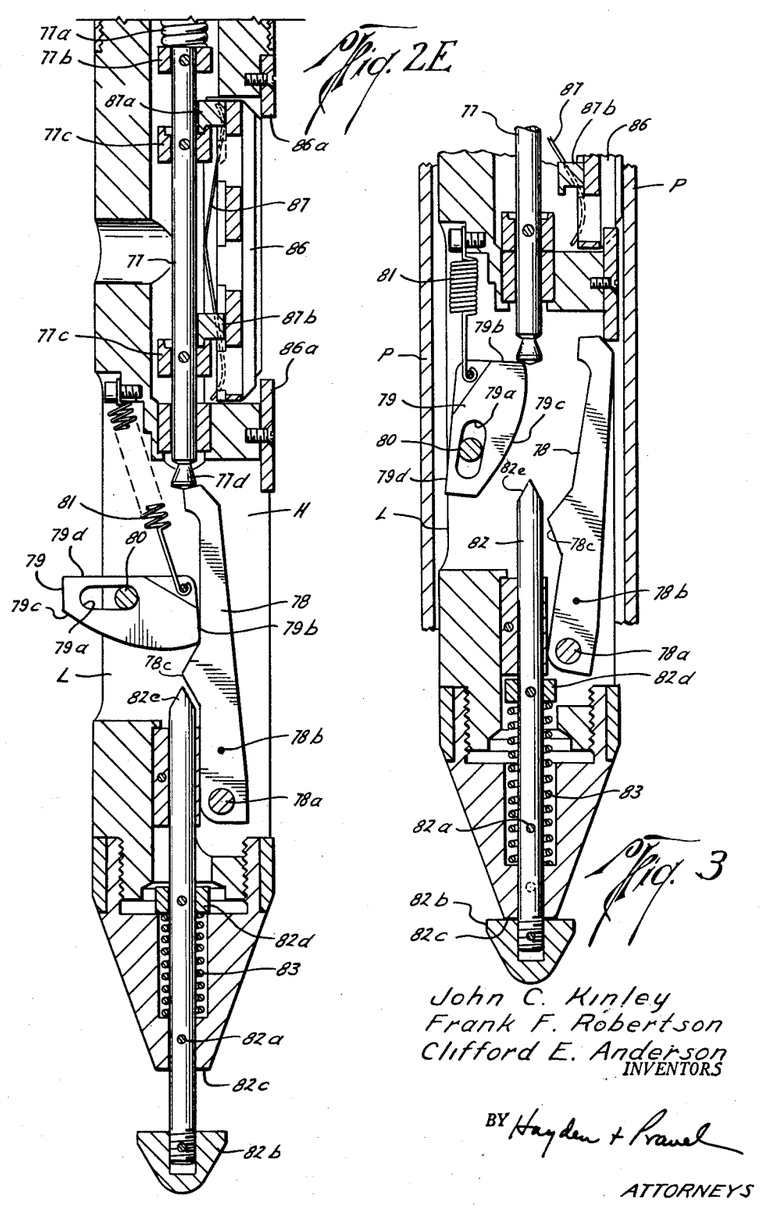
FIG. 3 is a vertical sectional view, partly in elevation, illustrating the lower end of the well calipering tool shown in FIGS. 1 through 2E after the latch mechanism has been released.

The drive wheel 70 is maintained in a retracted or inactive position (FIG. 2D) so that the wheel 70 does not project beyond the housing H by means of a holding pin 77 which is slidably mounted in the housing H in any suitable manner for longitudinal movement relative thereto. The pin 77 is held in an upward position as shown in FIGS. 2D and 2E by the releasable latch means L to be hereinafter described. A spring 77a is mounted around the pin 77 and it rests upon a collar 77b which is secured to the pin 77 while the upper end of the spring 77a engages a plug 95 so that the spring 77a acts to urge the pin 77 downwardly. The pin 77 also has retaining cups 77c secured thereon, the purpose of which will be explained. The lower end 77d of the pin 77 is in engagement with the latch arm 78 which is pivoted about a pivot pin 78a and which is preferably held in a substantially upright position by a shear pin 78b which extends through the arm 78 and through the wall of the housing H therewith. So long as the latch arm 78 is in the substantially upright position in engagement with the lower end 77d of the pin 77, the spring 77a is under compression and the pin 77 is held against downward movement. A releasing dog 79 which includes an elongated slot 79a is mounted on a pivot pin 80 which extends through the slot 79a and through the wall of the housing H so as to permit a pivoting action of the release dog 79 with respect to the housing H. A spring 81 connects with the dog 79 and the housing H to hold the dog 79 in the position shown in FIG. 2E with the substantially vertical surface 79b in engagement with the latch arm 78. The spring tension from the spring 81 is, however, not sufficient to move the arm 78 to the right as viewed in FIG. 2E. As the device is lowered into the well, the curved surface 79c rides on the inside of the tubing and the collars which are encountered in the pipe or tubing and freely moves upwardly without affecting the position of the latch arm 78. When it is desired to release the latch arm 78, the calipering tool T of this invention is raised upwardly so that the substantially horizontal surface 79d is engaged with a collar or other substantially lateral surface in the pipe P to apply a counterclockwise movement to the dog 79 about the pivot pin 80. Such movement imparts a force in the right hand direction to the latch arm 78 (as viewed in FIG. 2E) because the surface 79b acts against the arm 78 and moves in an arc which extends to the right of the substantially vertical position shown in FIG. 2E. In that manner, the shear pin 78b is severed and the arm 78 is moved to the right sufficiently so that the spring 77a moves the pin 77 downwardly to the position shown in FIG. 3.

In some instances, it may be desirable to release the latch arm 78 by engaging the bottom of the hole or some other surface at the lower end of the tool T rather than engaging the dog 79 in a collar or lateral surface in the pipe P. In that instance, the latch release mechanism employed includes a movable rod 82 which is slidably mounted in the housing near the lower end thereof and which is secured thereto with a shear pin 82a so that the head 82b extends below the lower end 82c of the housing as shown in FIG. 2E. A spring 83 is confined under compression at the lower end of the housing in engagement with a collar 82d which is secured to the rod 82 for holding the head 82b in the raised position shown in FIG. 3 so when the shear pin 82a is severed and the rod 82 is moved upwardly by the impact with the bottom of the well or other surface. Upon the upward movement of the rod 82, a pointed head 82e thereon engages a projection 78c on the arm 78 to urge the arm 78 laterally to shear the pin 78b and that accomplishes the movement of the latch arm 78 to the right with a sufficient force to initially shear or sever the shear pin 78b and to also move the arm 78 a sufficient distance to permit the spring 77a to move the pin 77 downwardly to the position shown in FIG. 3. The final position of the rod 82 after it has been used is illustrated in FIG. 3 of the drawings.

In order to maintain the lower end of the calipering tool T of this invention centered after the drive wheel 70 has moved out through a suitable opening such as opening 85 in the housing H into engagement with the pipe P, a shoe 86 is provided which is mounted in the housing H for lateral movement relative to the housing H. Leaf spring 87 is positioned behind or inside of the shoe 86 for urging the shoe 86 outwardly. The shoe 86 is connected to a pair of blocks 87a and 87b which are retained in a retracted position by latching in engagement with the latch cups 77c on the pin 77 as shown in FIG. 2E. After the pin 77 is released by the movement of the arm 78 to the right as previously explained, the cups 77c have moved downwardly relative to the blocks 87a and 87b so that the spring 87 can then force the shoe 86 into engagement with the inside surface of the pipe P. Suitable stop plates 86a are mounted on the housing H to limit the outward movement of the shoe 86.

In the operation or use of the calipering tool T of this invention, the tool T is lowered into the well pipe or tubing P, or other device to be calipered, with the drive wheel 70 in the retracted position shown in FIG. 2D and with the feelers F in the retracted position shown in FIG. 2B. Likewise, the centering means A is in the retracted position shown in FIG. 2A. Therefore, as the calipering tool T is lowered into the pipe P or other object to be calipered, the feelers F do not engage with the surface to be calipered and no record is made on the chart 54. When the tool T has reached the lowest level at which the calipering is to begin, the latch arm 78 is first released by either engaging the head 82b on the bottom of the hole in the well or other similar surface such as a bridging member or the dog 79 is engaged in a collar by pulling upwardly on the tool T from the surface of the well. The movement of the latch arm 78 to the right enables the spring 77a to move the pin 77 downwardly from the position shown in FIG. 2E to the position shown in FIG. 3. In that manner, the drive wheel 70 is permitted to move outwardly to the position shown in FIG. 4 because of the action of the spring 70p acting thereon. Also, the downward movement of the pin 77 releases the blocks 87a and 87b and the leaf spring 87 therewith so that the shoe 86 moves into engagement with the pipe P. Upward movement of the calipering tool T then causes the drive wheel 70 to rotate in engagement with the inside surface of the pipe P to impart a rotation to the stub shaft 70g, as previously explained. Such rotation of the shaft 70g causes the cam 74 to rotate to thereafter permit the lug 75 to pivot, as previously explained, so that the rod 28 is moved upwardly by the action of the spring 33. Such upward movement of the rod 28 effects the release of the fingers F into engagement with the inside of the pipe P since the retaining member 37 is moved upwardly above the upper ends of the feelers F as shown in FIG. 7. Also, the upward movement of the rod 28 permits a movement of the arms 18 outwardly by the action of the spring 26 so that the centering shoes 15 are moved outwardly into engagement with the pipe P.

Normally, at the beginning of a calipering operation the chart 54 would be positioned extended from the internally threaded sleeve 68 as shown in the drawings, and as the drive wheel 70 is moved in engagement with the pipe P by the upward movement of the calipering tool T in the pipe P, the drive tube 67 imparts rotation to the chart 54 so that it travels helically or spirally downwardly within the housing or body H of the tool. The styluses 52a are in engagement with the chart 54 to mark the surface of the chart 54 with a single line for each stylus 52a. Since there is a stylus 52a for each of the feelers F, a separate record is thus made for each of the feelers F.

It should be noted that prior to lowering the tool T into the pipe P, the sleeve 60 is moved to the intermediate position wherein the screw 53 is in the screw hole 53b. In that position, as previously explained, only one of the styluses 52a is in engagement with the chart 54, so that a reference line is made on the chart for a short distance. Such reference line may be valuable in determining from the record on the chart 54 which feeler or stylus is defective or is responding in a particular manner. Thereafter, the retractor fingers 50b are moved to the position shown in FIG. 2C wherein the screw 53 is in the screw hole 53c before the calipering tool T is lowered into the well, and such positioning of the fingers 50b is preferably accomplished at the surface of the well just prior to the lowering of the tool T into the well. Such movement of the retractor fingers 50b is accomplished, as previously explained, by a sliding of the retractor sleeve 60. When the sleeve 60 is in the position shown in FIG. 2C, the fingers 50b are not interfering with the normal movement of the styluses 52a in engagement with the surface of the chart 54. Therefore, if any irregularities are encountered by any of the feelers F as the tool T is moved or pulled longitudinally upwardly in the pipe P, the normally smooth helical or spiral line traced by the stylus 52a with that feeler will be varied to indicate the surface variation at the point encountered by the feeler F. In that manner, an accurate indication as to the condition of the surface on the inside of the pipe P is obtained on the chart surface of the chart 54.

When the complete calipering operation is completed, the calipering tool T is removed from the well or pipe P and the chart 54 is removed from the body of the tool by the disassembly thereof. Prior to the removal of the chart 54 from the body H, the sleeve 60 can be again moved to the intermediate position so that a short trace line with the single stylus is made at the upper end of the chart 54. It will be understood that for each run of a tool in a pipe P, it will normally require a new chart 54, and for that purpose, the charts 54 are replaceable.

It should be understood that the tool T of this invention may be used for a calipering operation on surfaces other than in a pipe and therefore, even though the invention is described for use in a pipe, the use of the invention is not limited thereto.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a calipering tool for use in a pipe and having a body, and feeler means mounted with said body for engaging the surface of the pipe being calipered and for moving in response to the variations in said surface, the improvement residing in a centering means comprising, at least three longitudinally extending pipe engaging members mounted in said body for lateral movement relative thereto, means mounting each of said pipe engaging members for a limited lateral tilting for enabling each pipe engaging member to shift into engagement with the pipe, resilient means in said body, and means for transmitting the force of said resilient means uniformly to each of said pipe engaging members to effect a centering of said body in said pipe.

2. In a calipering tool for use in a pipe and having a body, and feeler means mounted with said body for engaging the surface of the pipe being calipered and for moving in response to the variations in said surface, the improvement residing in a centering means comprising, at least three longitudinally extending pipe engaging members mounted in said body for lateral movement relative thereto, means mounting each of said pipe engaging members for a limited lateral tilting for enabling each pipe engaging member to shift into engagement with the pipe, a spring in said body, and means for transmitting the force of said spring uniformly to each of said pipe engaging members to effect a centering of said body in said pipe.

3. In a calipering tool for use in a pipe and having a body, and feeler means mounted with said body for engaging the surface of the pipe being calipered and for moving in response to the variations in said surface, the improvement residing in a centering means comprising, a plurality of pipe engaging shoes mounted in said body for lateral movement relative thereto, resilient means in said body, means engageable with each of said pipe engaging shoes for enabling each of such shoes to pivot in at least two directions and for transmitting the entire force of said resilient means to less than all of said pipe engaging shoes when said body is not centered so as to shift the body laterally in the pipe until the resilient means is applying an equal force to each pipe engaging shoe.

4. In a calipering tool for use in a pipe and having a body, and feeler means mounted with said body for engaging the surface of the pipe being calipered and for moving in response to the variations in said surface, the improvement residing in a centering means comprising, a plurality of pipe engaging members mounted in said body for lateral movement relative thereto, resilient means in said body, and a rocker arm in engagement with each pipe engaging member but separate therefrom, each rocker arm being pivotally mounted in said body in engagement with said resilient means for transmitting the force of said resilient means uniformly to each of said pipe engaging members to effect a centering of said body in said pipe.

5. The structure set forth in claim 4, including means mounting said resilient means in said body for applying a longitudinal force to said rocker arms to cause same to pivot for effecting an outward lateral movement of said pipe engaging members.

6. The structure set forth in claim 4, wherein each rocker arm engages each pipe engaging member in a single area at substantially the mid-point thereof to uniformly distribute the load on each pipe engaging member.

7. A centering means for use in a tool to center the body of the tool in a pipe, comprising a plurality of pipe engaging members mounted in said body for lateral movement relative thereto, resilient means in said body, rocker arm means for mounting each pipe engaging member in said body for lateral movement relative to the body to engage the external surface of each pipe engaging member with the inside surface of the pipe, means mounting each of said pipe engaging means with one of said rocker arm means for longitudinal and lateral rocking movement relative to said rocker arm means, and means for transmitting the force of said resilient means to each of said pipe engaging members for effecting an engagement of each pipe engaging member with the inside of the pipe for centering said body in said pipe.

8. A centering means for use in a tool to center the body of the tool in a pipe, comprising at least three pipe engaging members mounted in said body for lateral movement relative thereto, resilient means in said body, rocker arm means for mounting each pipe engaging member in said body for lateral movement relative to the body to engage the external surface of each pipe engaging member with the inside surface of the pipe, means mounting each of said pipe engaging means with one of said rocker arm means for longitudinal and lateral rocking movement relative to said rocker arm means, and means for transmitting the force of said resilient means to each of said pipe engaging members for effecting an engagement of each pipe engaging member with the inside of the pipe for centering said body in said pipe.

9. The structure set forth in claim 8, including means mounting said resilient means in said body for applying a longitudinal force to said rocker arm means to cause same to pivot for effecting the outward lateral movement of said pipe engaging members.

10. The structure set forth in claim 8, wherein each rocker arm means includes a rocker arm which acts on each pipe engaging member in a single area at substantially the mid-point thereof to accomplish said rocking movement for thereby distributing the load on each pipe engaging member to several points of engagement with the pipe.

11. A centering means for use in a tool to center the body of the tool in a pipe, comprising a plurality of pipe engaging members longitudinally mounted in said body for lateral movement relative thereto, a pair of longitudinally extending runners on the external surface of said pipe engaging members for engaging said pipe, resilient means in said body, and means for transmitting the force of said resilient means uniformly to each of said pipe engaging members to effect a centering of said body in said pipe.

12. A centering means for use in a tool to center the body of the tool in a pipe, comprising a plurality of pipe engaging members mounted in said body for lateral movement relative thereto, resilient means in said body, mounting means for mounting each pipe engaging member in said body for swinging movement relative to the body to engage the external surface of each pipe engaging member with the inside surface of the pipe at several spaced areas only, means forming a part of said mounting means for transmitting the force of said resilient means to each of said pipe engaging members to effect a centering of said body in said pipe, and a releasable lock means for locking the transmitting means to prevent an urging of said pipe engaging members into contact with the pipe until a release thereof is effected.

13. In a calipering tool for use in a pipe and having a body, and a plurality of feeler means mounted with said body for engaging the surface of the pipe being calipered and for moving in response to the variations in said surface, the improvement residing in a separate transmitting means for transmitting the movements of each of the feeler means, each of said transmitting means having a fulcrum point about which bending of said transmitting means occurs, and an annular fluid seal laterally positioned adjacent said fulcrum point in sealing contact with the body and with all of said transmitting means extending therethrough and in sealing contact therewith so as to seal off a portion of said body without interfering with the transmission of the feeler movements by said transmitting means.

14. In a calipering tool for use in a pipe and having a body, a chart in said body, and a stylus member for marking on said chart, the improvement residing in, an adjustable mounting means for said stylus member comprising, a stylus block having the stylus member therewith, an adjusting block movable relative to said stylus block, and means for adjusting said stylus block both longitudinally and laterally with respect to said adjusting block to adjust the position of said stylus member relative to said chart.

15. The structure set forth in claim 14, wherein the adjusting means includes pins each having a tapered end and mounted in said adjusting block, and tapered surfaces formed on said stylus block for engagement by the tapered ends of said pins for effecting a controlled longitudinal and lateral relative movement of said adjusting block and said stylus block by moving the tapered end of one or more of said pins relative to and in contact with one or more of said tapered surfaces.

16. The structure set forth in claim 14, including guide means in said body above and below said adjusting block for guiding said adjusting block as it moves longitudinally relative to said body.

17. In a calipering tool for use in a pipe and having a body, a chart in said body, a stylus member for marking on said chart, and feeler means mounted with said body for engaging the surface of the pipe being calipered and for moving in response to the variations in said surface, the improvement residing in, latch means for latching said feelers in a retracted position to prevent contact thereof with the pipe, drive means for rotating said chart, a release means for said latch means including a pivoted lock lug mounted in said body, and a rotatable cam engageable with said pivoted lock lug to prevent release of said latch means until released, and means operable by said drive means for rotating said cam to release said lock lug for thereby releasing said latch means.

18. In a calipering tool for use in a pipe and having a body, and a plurality of feeler means mounted with said body for engaging the surface of the pipe being calipered and for moving in response to the variations in said surface, the improvement residing in a separate transmitting means for transmitting the movements of each of the feeler means, each of said transmitting means including a transmitting arm, a stylus tube having a radial slot therein for positioning each transmitting arm circumferentially, a sleeve mounted with said tube internally of said arms, said sleeve having a circumferential groove formed therein, a locating ball positioned in each radial slot and in contact with the walls of said circumferential groove, and means on each arm engageable with one of the balls for positioning each arm longitudinally in said stylus tube.

19. In a calipering tool for use in a pipe and having a body, and feeler means mounted with said body for engaging the surface of the pipe being calipered and for moving in response to the variations in said surface, the improvement residing in a chart, a plurality of stylus members adapted to engage said chart and move relative thereto in response to movements of said feeler means, and retractor means mounted in said body for retracting all of said stylus members from engagement with said chart and for selectively retracting only a portion of said stylus members from engagement with said chart.

20. In a calipering tool for use in a pipe and having a body, and feeler means mounted with said body for engaging the surface of the pipe being calipered and for moving in response to the variations in said surface, the improvement residing in a chart, a plurality of stylus members adapted to engage said chart and move relative thereto in response to movements of said feeler means, and retractor means mounted in said body for retracting all except one of said stylus members from engagement with said chart whereby rotation of said chart relative to the stylus member in engagement therewith produces a reference line when all of said stylus members subsequently are in engagement with said chart.

21. In a calipering tool for use in a pipe and having a body, a chart in said body, and a stylus member for marking on said chart, the improvement residing in, an adjustable mounting means for said stylus member comprising, a stylus block having the stylus member therewith, an adjusting block movable relative to said stylus block, means for adjusting said stylus block both longitudinally and laterally with respect to said adjusting block to adjust the position of said stylus member relative to said chart, said adjusting block having a substantially V-shaped inner surface at the upper and lower ends thereof, a resilient arm mounted in said body and having a substantially V-shaped groove in its outer surface into which the V-shaped inner surface at the upper end is positioned, and a guide element in said body and having a substantially V-shaped groove for receiving the V-shaped inner surface at the lower end of said adjusting block, whereby said adjusting block and the stylus block and stylus member therewith are prevented from moving laterally or circumferentially during their longitudinal movement relative to said chart.

22. In a calipering tool for use in a pipe and having a body, and feeler means mounted with said body for engaging the surface of the pipe being calipered and for moving in response to the variations in said surface, the improvement residing in a latch means for said feelers and a dual release mechanism for said latch means, said dual release mechanism including a release means having a head for engagement with the bottom of a well or similar lateral obstruction in the well pipe upon a downward movement of the tool for effecting the release of said latch means, and another release means having a dog for engagement with a pipe collar upon an upward movement of the tool in the pipe to effect the release of said latch means, whereby said latch means is releaseable by a movement of said tool in either an upward or a downward direction.

23. In a calipering tool for use in a pipe and having a body, a chart in said body, and a drive means including a drive wheel engageable with said pipe for driving said chart as said body is moved in said pipe, the improvement residing in a gear drive connection between said drive wheel and said chart for driving said chart at a more rapid rate than with said drive wheel, and means for disengaging the gear drive connection from the drive wheel whereby a hand operated tool may be connected to said gear drive for rapidly moving said chart when desired.

24. In a calipering tool for use in a pipe and having a body, a chart in said body, and a stylus member for marking on said chart, the improvement residing in, means for mounting and moving said chart relative to said stylus member comprising, an internally threaded sleeve mounted in said body, an annular nut having external threads in coacting threaded engagement with the internal threads in said sleeve, means connecting said nut to said chart for movement therewith, means for imparting rotation to said nut to effect a longitudinal travel of said nut and said chart relative to said sleeve, and means for automatically disconnecting said annular nut from the means for imparting rotation thereto when said nut has reached the end of the travel in the sleeve, whereby damage to the chart and other parts of the tool is prevented.

25. In a calipering tool for use in a pipe and having a body, a chart in said body, and a stylus member for marking on said chart, the improvement residing in drive means for driving said chart from one end thereof to normally effect a rotation of said chart relative to said stylus member, a support means for said chart adapted to move longitudinally relative to said drive means for disengaging said drive means, and means for imparting rotation to said chart from the other end thereof when said drive means is disengaged.

26. In a calipering tool for use in a pipe and having a body, a chart in said body, and a stylus member for marking on said chart, the improvement residing in an adjusting block to adjust the position of said stylus member relative to said chart, said adjusting block having a substantially V-shaped inner surface at the upper and lower ends thereof, a resilient arm mounted in said body and having a substantially V-shaped groove in its outer surface into which the V-shaped inner surface at the upper end is positioned, and a guide element in said body and having a substantially V-shaped groove for receiving the V-shaped inner surface at the lower end of said adjusting block, whereby said adjusting block and stylus member therewith are prevented from moving laterally or circumferentially during their longitudinal movement relative to said chart.

27. In a calipering tool for use in a pipe and having a body, and a plurality of feeler means mounted with said body for engaging the surface of the pipe being calipered and for moving in response to the variations in said surface, the improvement residing in a separate transmitting means for transmitting the movements of each of the feeler means, an annular seal laterally positioned in sealing contact with the body and with all of said transmitting means extending therethrough and in sealing contact therewith so as to seal off a portion of said body without interfering with the transmission of the feeler movements by said transmitting means, said transmitting means including a plurality of circumferentially spaced transmitting members which are mounted in said body for flexing about an intermediate point thereof in response to the movements of the feeler means, and said fluid seal being disposed substantially adjacent to the intermediate points of the transmitting members so that the seal is provided on the transmitting members as close to the point of minimum movement thereof as possible.

28. In a calipering tool for use in a pipe and having a body, and feeler means mounted with said body for engaging the surface of the pipe being calipered and for moving in response to the variations in said surface, the improvement residing in a chart, a plurality of stylus members adapted to engage said chart and move relative thereto in response to movements of said feeler means, retractor means mounted in said body for effecting a retraction of said stylus members from engagement with said chart, and said retractor means including a longitudinally movable member having means for engaging each of said stylus members to effect the retraction thereof.

29. In a calipering tool for use in a pipe and having a body, and feeler means mounted with said body for engaging the surface of the pipe being calipered and for moving in response to the variations in said surface, the improvement residing in a chart, a plurality of stylus members adapted to engage said chart and move relative thereto in response to movements of said feeler means, retractor means mounted in said body for effecting a retraction of said stylus members from engagement with said chart, said retractor means including a longitudinally movable member having means for engaging each of said stylus members to effect the retraction thereof, and means for moving said longitudinally movable member in said body out of engagement with said stylus members to release said stylus members for movement into engagement with said chart.

References Cited in the file of this patent

UNITED STATES PATENTS

| | | |
|---|---|---|
| 1,252,634 | Walker | Jan. 8, 1918 |
| 2,102,080 | Kinley | Dec. 14, 1937 |
| 2,518,663 | Chanel et al. | Aug. 15, 1950 |
| 2,578,236 | Fredd | Dec. 11, 1951 |
| 2,766,533 | Brandon | Oct. 16, 1956 |
| 2,771,685 | Kinley | Nov. 27, 1956 |
| 2,789,357 | Schramm | Apr. 23, 1957 |
| 2,915,830 | Price | Dec. 8, 1959 |

FOREIGN PATENTS

| | | |
|---|---|---|
| 384,419 | Germany | Nov. 17, 1923 |
| 712,990 | Germany | Oct. 29, 1941 |